(12) United States Patent
Sykes, Jr.

(10) Patent No.: US 7,020,688 B2
(45) Date of Patent: Mar. 28, 2006

(54) METHODS AND SYSTEMS FOR ARCHIVING AND VERIFICATION OF ELECTRONIC COMMUNICATIONS

(75) Inventor: George H. Sykes, Jr., Granite City, IL (US)

(73) Assignee: Financial Network, Inc., St. Louis, MO (US)

(*) Notice: Subject to any disclaimer, the term of this patent is extended or adjusted under 35 U.S.C. 154(b) by 662 days.

(21) Appl. No.: 09/948,055

(22) Filed: Sep. 5, 2001

(65) Prior Publication Data

US 2002/0129108 A1 Sep. 12, 2002

Related U.S. Application Data

(60) Provisional application No. 60/229,998, filed on Sep. 5, 2000.

(51) Int. Cl.
*G06F 15/16* (2006.01)

(52) U.S. Cl. ........................ 709/206; 709/207

(58) Field of Classification Search ............... 709/206, 709/207
See application file for complete search history.

(56) References Cited

U.S. PATENT DOCUMENTS

| | | | |
|---|---|---|---|
| 5,805,810 A * | 9/1998 | Maxwell | 709/206 |
| 6,122,372 A * | 9/2000 | Hughes | 380/2 |
| 6,640,301 B1 * | 10/2003 | Ng | 713/156 |
| 6,671,718 B1 * | 12/2003 | Meister et al. | 709/206 |
| 6,721,783 B1 * | 4/2004 | Blossman et al. | 709/206 |
| 6,725,381 B1 * | 4/2004 | Smith et al. | 713/202 |
| 6,732,101 B1 * | 5/2004 | Cook | 707/10 |
| 6,760,752 B1 * | 7/2004 | Liu et al. | 709/206 |
| 6,779,178 B1 * | 8/2004 | Lloyd et al. | 717/174 |
| 2002/0029275 A1 * | 3/2002 | Selgas et al. | 709/227 |
| 2002/0161589 A1 * | 10/2002 | Strandberg | 705/1 |

FOREIGN PATENT DOCUMENTS

WO WO 99/21330 * 4/1999

* cited by examiner

*Primary Examiner*—Zarni Maung
*Assistant Examiner*—Nghi Tran
(74) *Attorney, Agent, or Firm*—Harness Dickey & Pierce PLC

(57) ABSTRACT

A method and system for archiving and/or verifying electronic communications. The method and system provide verification of an email sent by a sender to a recipient, comprising receiving a copy of an email as an addressee; indexing the email according to at least one of sender, recipient, date, or subject matter; and storing an exact copy of the email as received. The method and system also provide for secure electronic communication between a sender and at least one recipient, comprising receiving from the sender view a secure internet connection a message and the email address of at least one intended recipient of the message; sending an email message to the at least one intended recipient of the message that a message is waiting; transmitting the message to the at least one intended recipient via a secure internet connection established by the at least one intended recipient; and sending an email message to the sender that the at least one recipient has been sent the message. The method and system also provide for transmitting a facsimile for a sender to a recipient, the comprising: receiving an electronic facsimile message from the sender together with the facsimile number of the recipient; storing a copy of the electronic facsimile message; transmitting the facsimile message to the facsimile number of the recipient.

5 Claims, 21 Drawing Sheets

Wed, Sep 5, 2001 11:22 AM

Subject: test message for gProof
Date: Wednesday, September 5, 2001 11:19 AM
From: Steve Goyette <steve@wildfire.net>
To: Sandy Goyette <sandyg@thew.com>
Cc: <steve_g@gProof.com> test message.

thanks, steve

Fig. 2a

Wed, Sep 5, 2001 05:24 PM

Subject: Confirmed: 200109051722180283932703
Date: Wednesday, September 5, 2001 05:22 PM
From: gProof Postmaster <postmaster@gProof.com>
To: <steve@wildfire.net>

NOTICE: gProof.com has received and cataloged the attached email message.

gProof.com provides an independent third party verification of all your email activity, whether you are sending or receiving, protecting both the integrity and security of all messages. Get your own gProof.com account by going to http://www.gProof.com

```
DOCUMENT: 200109051722180283932703
TO: sandyg@thew.com
FROM: steve@wildfire.net
SUBJECT: test message
DATE: 09/05/2001
```

Fig. 2b

From: Steve Goyette <steve@wildfire.net>
Date: 05 Sep 2001 17:21:22 -0500
To: Sandy Goyette <sandyg@thew.com>
Cc: steve_g@gProof.com
Subject: test message test message

|  | Y1 | Y2 | Y3 | Y4 | Y5 | Y6 | Y7 |
|---|---|---|---|---|---|---|---|
| Under 10K | 0.25 | 0.40 | 0.55 | 0.70 | 0.85 | 1.00 | 1.15 |
| Under 100K | 0.50 | 0.75 | 1.00 | 1.25 | 1.50 | 1.75 | 2.00 |
| Under 500K | 0.75 | 1.10 | 1.45 | 1.80 | 2.15 | 2.50 | 2.85 |
| Under 1M | 1.00 | 1.50 | 2.00 | 2.50 | 3.00 | 3.50 | 4.00 |
| Under 2M | 1.50 | 2.00 | 2.50 | 3.00 | 3.50 | 4.00 | 4.50 |
| Under 3M | 2.00 | 2.75 | 3.50 | 4.25 | 5.00 | 5.70 | 6.50 |
| Under 4M | 2.50 | 3.50 | 4.50 | 5.50 | 6.50 | 7.50 | 8.50 |
| Per Meg over 4M | 0.50 | 1.00 | 1.50 | 2.00 | 2.50 | 3.00 |  |

Fig. 3

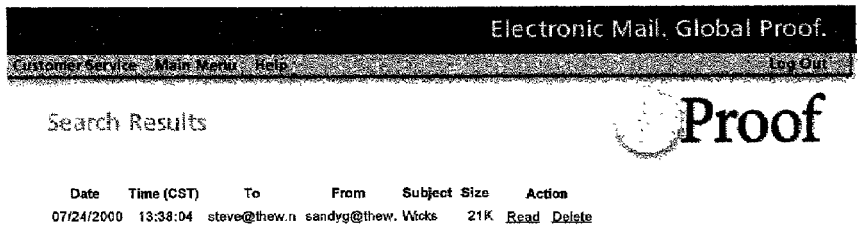
Fig. 9
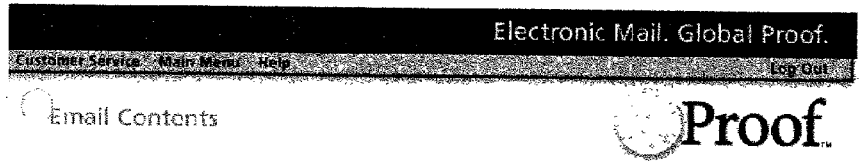
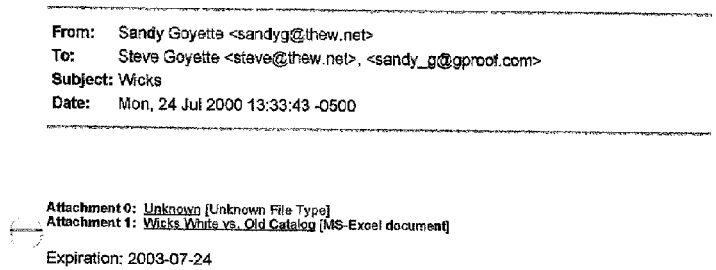
Fig. 10

Received: from gProof.com (gproof.com [208.199.92.5]) by thew.net
    (8.11.3/8.11.3) with ESMTP id f85GYHj28736 for <steve@wildfire.net>; Wed, 5
    Sep 2001 11:34:17 -0500 (CDT)
Received: (from gpd@localhost) by gProof.com (8.10.0/8.10.0) id
    f85GK9W36102; Wed, 5 Sep 2001 11:20:09 -0500 (CDT)
Date: Wed, 5 Sep 2001 11:20:09 -0500 (CDT)
Message-Id: <200109051620.f85GK9W36102@gProof.com>
Mime-Version: 1.0
X-Mailer: MIME-tools 4.104 (Entity 4.117)
From: "gProof Postmaster" <postmaster@gProof.com>
To: steve@wildfire.net
Subject: Confirmed: 200109051120070283932702
Content-Type: multipart/mixed; boundary="------------=_999706808-17808-1"
X-Evolution-Source: pop://GOYS25@mail.mailduster.com/inbox
X-Evolution: 00000534-0020

This is a multi-part message in MIME format...

------------=_999706808-17808-1
Content-Type: text/plain
Content-Disposition: inline NOTICE: gProof.com has received and cataloged the attached email message.

gProof.com provides an independent third party verification of all your email
activity, whether you are sending or receiving, protecting both the integrity
and security of all messages. Get your own gProof.com account by going to
http://www.gProof.com ------------------------------
DOCUMENT: 200109051120070283932702
TO: sandyg@thew.com
FROM: steve@wildfire.net
SUBJECT: test message for gProof
DATE: 09/05/2001
------------------------------

------------=_999706808-17808-1
Content-Type: message/rfc822; name="Email"
Content-Disposition: inline; filename="Email"
Content-Transfer-Encoding: 7bit
Content-Description: Email Message >From steve@wildfire.net Wed Sep 5 11: 20:05 2001  _MTA Host
Received: from outbox.thew.net (qmailr@[208.199.92.48]) by gProof.com
    (8.10.0/8.10.0) with SMTP id f85GK5Q36114 for <steve_g@gProof.com>; Wed, 5
    Sep 2001 11:20:05 -0500 (CDT)
Received: (qmail 28904 invoked from network); 5 Sep 2001 16:27:04 -0000
Received: from pool1.thew.net (HELO homer.thew.net) (208.199.92.15) by
    208.199.92.48 with SMTP; 5 Sep 2001 16:27:04 -0000
Subject: test message for gProof
From: Steve Goyette <steve@wildfire.net>
To: Sandy Goyette <sandyg@thew.com>
Cc: steve_g@gProof.com  - gProof Account
Content-Type: text/plain
Content-Transfer-Encoding: 7bit
X-Mailer: Evolution/0.12 (Preview Release)
Date: 05 Sep 2001 11:19:14 -0500
Message-Id: <999706780.850.76.camel@homer>
Mime-Version: 1.0 test message.

thanks, steve

------------=_999706808-17808-1--

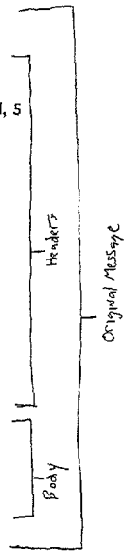

Fig. 26

Wed, Sep 5, 2001 11:22 AM

Subject: test message for gProof
Date: Wednesday, September 5, 2001 11:19 AM
From: Steve Goyette <steve@wildfire.net>
To: Sandy Goyette <sandyg@thew.com>
Cc: <steve_g@gProof.com> test message.

thanks, steve

---

NOTARIZED GPROOF

---

Date: September 5, 2001
Time: 05:22:01 PM
This message has been verified by gProof.com

---

Fig. 27 ial Appli-
METHODS AND SYSTEMS FOR ARCHIVING AND VERIFICATION OF ELECTRONIC COMMUNICATIONS

CROSS-REFERENCE TO RELATED APPLICATION

This application claims priority of U.S. Provisional Application Ser. No. 60/229,998, filed Sep. 5, 2000, the disclosure of which is incorporated herein in its entirety.

FIELD OF THE INVENTION

This invention relates to electronic communications such as emails and facsimiles, and in particular to methods of archiving and verifying electronic communications.

BACKGROUND OF THE INVENTION

Electronic communications such as emails and facsimiles are continuing to replace pure paper-based methods of communications. A problem with electronic communications versus their paper-based counterparts is that some electronic communications can be altered, sometimes without detection, and thus it is difficult to verify what was sent, when it was sent, or when it was received. With respect to email, it can be difficult for an email sender to prove that an email was actually sent, when it was sent, or what the contents were, or whether it was received. Likewise with respect to facsimiles, it can be difficult for a facsimile sender to prove that that a facsimile was actually sent, when it was sent, or what the contents were, or whether it was received.

SUMMARY OF THE INVENTION

This invention relates to archiving and/or verifying electronic communications. According to a first aspect of the invention relating to sending verifiable email messages, the invention comprises addressing the email to a third party verification provider, either as an addressee or as a cc, who will index the message according to at least one of sender, date, recipient, and subject, and store an exact copy of the e-mail message. Similarly, the invention also relates to providing email verification of an email sent by a sender to a recipient, comprising receiving a copy of an email as an addressee; indexing the email according to at least one of sender, recipient, date, or subject matter; and storing an exact copy of the email as received.

According to a second aspect of the invention relating to secure electronic communication, the invention comprises transmitting to a third party via a secure internet connection a message and the email address of at least one intended recipient of the message, who will send an email message to the intended recipient indicating that a message is waiting for the intended recipient via a secure internet connection, transmit the message to the intended recipient who establishes a secure internet connection with the third party, and sends an email to the sender when the message has been transmitted to an intended recipient. Similarly, the invention relates to providing secure electronic communication between a sender and at least one recipient, comprising receiving from the sender view a secure internet connection a message and the email address of at least one intended recipient of the message; sending an email message to the at least one intended recipient of the message that a message is waiting; transmitting the message to the at least one intended recipient via a secure internet connection established by the at least one intended recipient; and sending an email message to the sender that the at least one recipient has been sent the message.

According to an alternative embodiment of the second aspect of this invention relating to transmitting a message including at least two options to a recipient and receiving the recipient's selection, the invention comprises transmitting a message including at least two options to a third party that communicates the message to the recipient, receives the recipient's selection, and transmits the recipient's selection back to the sender. Similarly the invention also relates to providing for transmission of a message including at least two options to a recipient and transmitting the recipient's selection to the sender, comprising receiving from the sender via a secure connection, the message, including at least two options, and the email address of at least one intended recipient of the message; sending an email message to the at least one intended recipient of the message that a message is waiting; transmitting the message to the at least one intended recipient via a secure internet connection established by the at least one intended recipient, together with instructions to the recipient about how to make the selection; receiving the selection from the intended recipient; sending an email message to the sender that the at least one recipient has made a selection; communicating the recipient's selection to the sender via a secure internet connection established by the sender.

According to a third aspect of this invention relating to transmitting a verifiable facsimile message to at least one intended recipient, the invention comprises sending the facsimile together with the facsimile number of the at least one intended recipient to a third party who will store an copy of the facsimile as received and transmit the facsimile to the intended recipient. The invention also relates to a method of transmitting a facsimile for a sender to a recipient, the method comprising: receiving an electronic facsimile message from the sender together with the facsimile number of the recipient; storing a copy of the electronic facsimile message; transmitting the facsimile message to the facsimile number of the recipient.

These and other features and advantages will be in part apparent and in part pointed out hereinafter.

BRIEF DESCRIPTION OF THE DRAWINGS

FIG. 2a is a sample email message; and

FIG. 2b is a sample confirmation of the archiving of the sample email message of FIG. 2a;

FIG. 3 is a sample pricing matrix for the archiving and verification services in accordance with the first aspect of this invention;

FIG. 9 is an example of a search results screen, from using the "Find a Message—Simple Search" page;

FIG. 10 is an example of an "Email Contents" page, displaying the contents of an archived email;

FIG. 15 shows a "My Profile" page that might be displayed when the "Change My Profile" link on the FIG. 7 "Main Menu—Welcome" screen is followed;

FIG. 16 shows a "Change My Password" page that might be displayed when the "Change My Password" link on the FIG. 15 "My Profile" screen is followed;

FIG. 17 shows a "My Billing" page that might be displayed when the "Billing Options" link on the FIG. 15 "My Profile" screen is followed;

FIG. 26 is a sample of notification generated by the system of the archiving of an email;

FIG. 27 is a sample of a verified copy of an email provided by a Third Party Archiving and Verification Provider.

Corresponding reference numerals indicate corresponding parts throughout the several views of the drawings.

DETAILED DESCRIPTION OF THE INVENTION

According to a first aspect, this invention relates to a system and a method for senders to backup and archive email to a third party server without the need for conventional backup software, thereby providing proof of on-line communications. The system and method are preferably implemented by a third party archiving and verification provider using an Application Service Provider ("ASP") model that allows a sender to use the system and method regardless of his or her location on the Internet. An example of the structure of tables in a SQL database for implementing the system and method of this invention is shown in Appendix A, attached hereto, and incorporated herein by reference. In the preferred embodiment, no special software is required, and an email sender can use the system without changing his or her standard email process.

Figure 1:
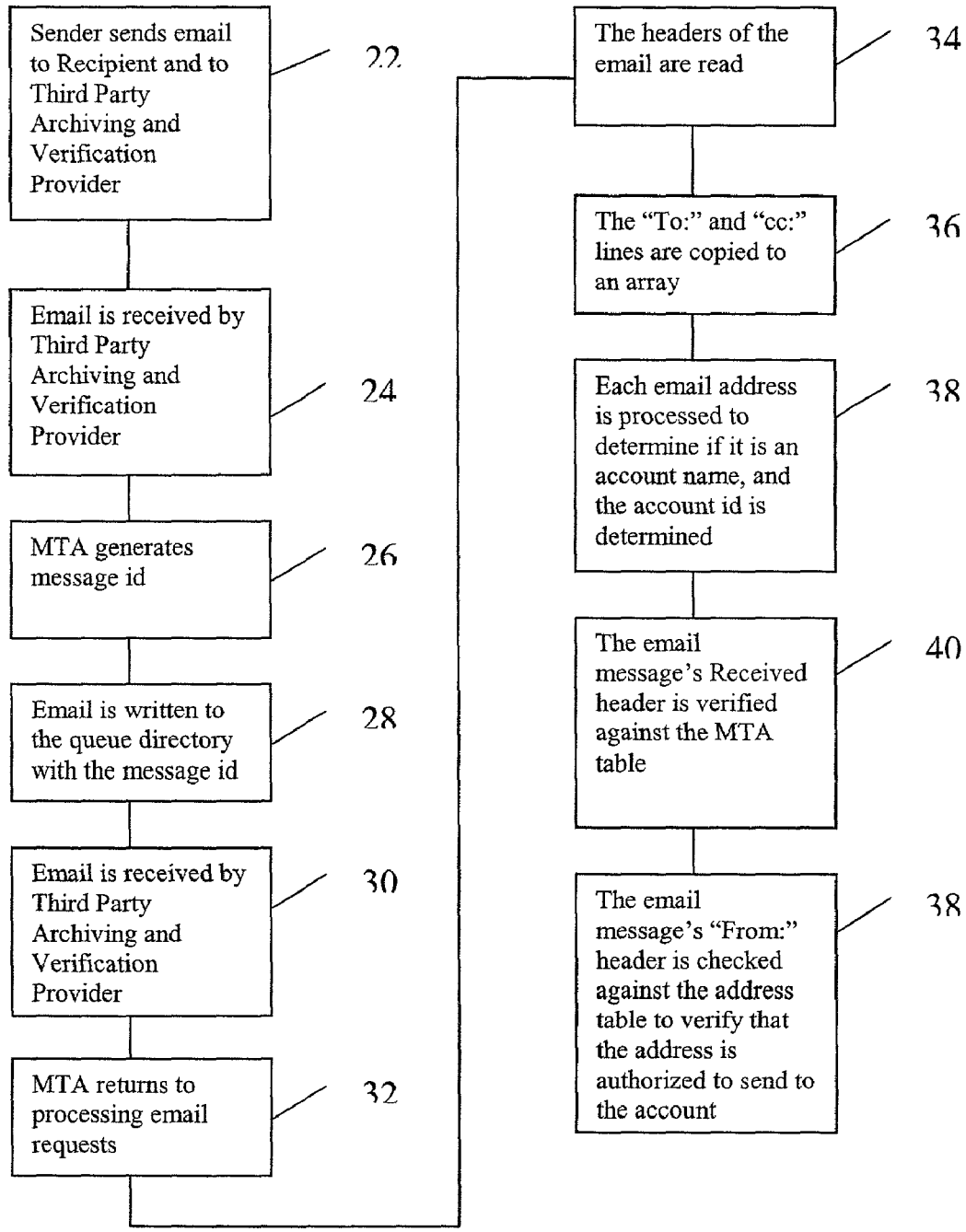
FIG. 1 is a schematic diagram of a method of archiving email in accordance with a first aspect of this invention.
Figure 1:
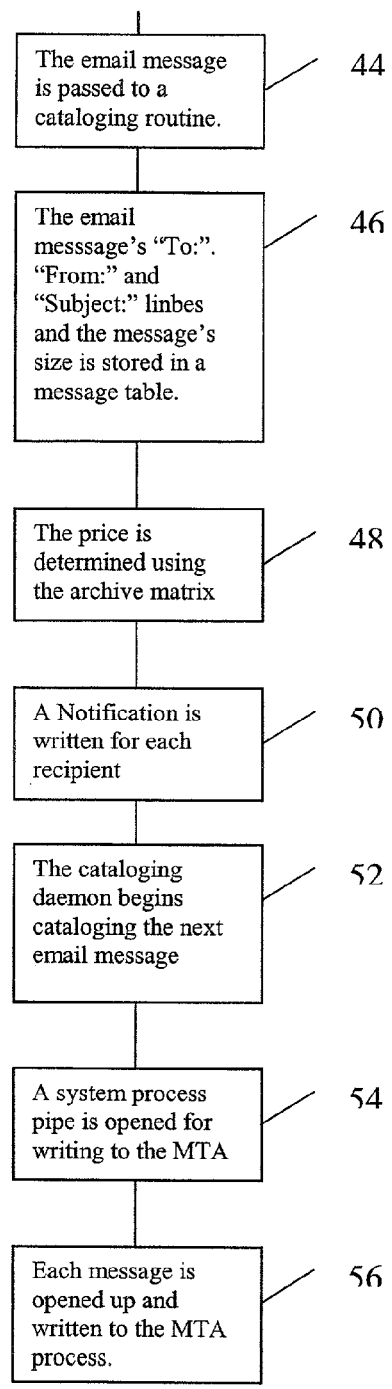

Referring to FIG. 1, at 22 the sender sends an email to the recipient, and to the third party archiving and verification provider either as an addressee (via the "To:" field) or as a copy (via the "CC:" field). Using any conventional email program, such as Outlook, Lotus Notes, Eudora, etc., the sender prepares an email to a recipient, and in the "To" field, or in the "CC:" field also addresses the email to the sender's account with the third party archiving and verification provider. For example an email sender would address the email, or copy the email, to his or her system account xxxxx@yyyyy.com, where xxxxx is a string identifying the sender's account with the third party archiving and verification provider, and where yyyyy.com is the third-party verification provider's email address.

At 24, the email message is received by the third party archiving and verification provider. At 26, a Message Transfer Agent (MTA), for example Sendmail, available from Sendmail, Emoryville, Calif., passes the email to a filter that generates an id based upon the time and date of receipt. The MTA is running on the system server. The email's id is preferably a 24 character identification code in the format yyyymmddhhmmssnnnnnnnnnn where yyyymmdd is an eight-character representation of the date of receipt, hhmmss is a six-character representation of the time of receipt, and nnnnnnnnnn is a unique ten-digit integer. At 28, the email message is written out to a queue directory based upon the id assigned to the email. At 30, a record is inserted into a queue table in the system's database, which cues a cataloging daemon to begin processing the message. At 32 the MTA returns to processing incoming mail requests.

The third party verification provider's system includes at least one, and preferably more than one, cataloging daemons that monitor the queue table in the system database. The cataloging daemons also run on the system server. The number of cataloging daemons depends upon the CPU and the IO. Each cataloging daemon is assigned an id that corresponds to the queue table and the queue directories. The queue table has 2 fields: a queue number and a queue message ID. The queue directory is structured as: /gp/gpc1/outgoing, /gp/gpc1/incoming, /gp/gpc0/outgoing, and /gp/gpc0/incoming, and depending on the number of queues desired, the gpc(number) directory would be correspondingly increased. The same applies for an outgoing queue; a single process is in charge of it as well. When a cataloging daemon encounters an entry in its queue, it begins processing.

At 34, the header of the email message is read, based on RFC-822 internet mail standards, (which standards are incorporated herein by references as if fully set forth). At 36, each email address in the "To:" and "CC:" lines of the email message's header are temporarily stored in an array, which may be a simple character pointer array. The "From:" line of the email message's header is temporarily stored separately. At 38, the cataloging daemon performs a lookup in an alias table of each email address to determine if that email address is a system account with the third party archiving and verification provider. If an email address is an account on the system, the cataloging daemon extracts the system's id for that account. At 40, if the address is valid, the email message's "Received:" header is verified with the MTA table. The MTA table is an extra security feature that stores and allows comparison with the mail relay authorized to deliver the email message to the account. This is an optional feature, that is preferably turned off by default for most accounts. The MTA table has 2 fields, user ID and the sender's MTA's host name. This ensures that the email message was sent from the proper internet mail relay, i.e. an email address that, according to the user's account profile, is authorized to send email to the account. At 42, if the internet mail relay is correct or if it is non-existent the cataloging daemon checks the email message's "From:" header against the address table to verify that the address is allowed to send to the system account. "Non-existent" means that no record is found in the MTA table for that user. This means that the user did not wish to restrict email coming in based on their outgoing mail server. If the user does have an entry and that entry does not match the value in the MTA table, the message is rejected and an error email is placed in the queue for delivery to the user who sent the email. At 44, if the operations at 38, 40 and 42 are successful, the email message is passed to a catalogue routine, which is part of the cataloging daemon. If there is an error, appropriate error routines are called.

At 46, the email message's "To:", "From:", and "Subject:" lines and the message's size are stored in the system's message table, with the email message referred to by its assigned message id. The message table has the following fields: a) message id; b) user id; c) folder id ( for later use in grouping messages); d) "To:" line; e) "From:" line; f) "Subject:" line; g) "Date:" line; h) "Time:" line; i) "Size:" line; j) expiration date; and k) has the message been paid for.

At 48, the archive matrix is used to determine the price of the email. The matrix, an example of which is shown in FIG. 3, is a cross of storage duration and message size. After the price of the email is determined, the price is inserted into the system's transaction table together with the email message's system id. The storage duration is determined based upon the default value in the sender's account profile with the third party archiving and verification provider, unless the sender selects a different duration. At 50, a notification is written for each recipient in the email message to an outgoing message queue directory. The notification preferably includes the system message id, the date that the message was archived, and the original contents of the message including all attachments. A sample message is shown in FIG. 26. At 52 the cataloging daemon checks its particular queue and begins processing the next email message An outgoing daemon handles the notifications in the outgoing message queue. The outgoing daemon is a process that runs at a lower priority than the MTA and the cataloging daemon to ensure that new messages enter the system at a high priority than the notifications. The outgoing daemon handles all outbound correspondence. Each outgoing daemon is assigned an id that corresponds to the queue table and the queue directories. When an outgoing daemon encounters an entry in its queue, processing begins.

At 54, a system process pipe is opened by a call from the outgoing daemon for writing to the MTA. At 56, each message is opened up and written to the MTA process, causing the MTA to send the mail out.

The email message remains stored with the third party archiving and verification provider for a time determined by the sender's user profile, which was established at the time the sender opened its account, as from time to time amended. Alternatively, the user could be allowed to select the time for storage at the time the message is sent. The user can also extend the time for storage later, as described below. The third party verification provider preferably provides the sender with access to the stored email messages via a web browser, allowing the sender to manage the stored messages, deleting unneeded messages, extending the storage time for messages, and requesting verified copies of messages.

Figure 4:
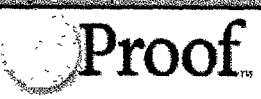
FIG. 4 is a view of a sample screen for providing account information for setting up an account with a third party archiving and verification provider providing services in accordance with the first aspect of this invention.
Figure 5:
FIG. 5 is a view of a sample screen for providing billing information for setting up an account with a third party archiving and verification provider providing services in accordance with the first aspect of this invention.

An example of a web page for providing account information for setting up an account via the Internet with a third party verification provider operating in accordance with the principles of this invention is shown in FIG. 4. As shown in FIG. 4, the page includes boxes to input the sender's name, the sender's address, the sender's city, the sender's state or region, the sender's zip code or postal code, the sender's country, the sender's phone number, the sender's fax number, and the sender's email address. The page also includes boxes for selecting a user id and selecting and confirming a password. The page includes a "Next" button for advancing to the next screen. An example of a page for providing billing information for setting up an account via the Internet with a third party archiving verification provider operating in accordance with the principles of this invention is shown in FIG. 5. As shown in FIG. 5, the page includes a box to select the default archive duration, selection buttons to select a billing option ("1. Send a monthly paper bill", "2. Send a monthly email bill and you pay online", and "3. We keep your credit card on line."). The page preferably also includes a box for selecting a credit card type, a box for entering a credit card number, and boxes for selecting the expiration date. The page also includes a "Previous" button for returning to the previous page, and a "Next" button for advancing to the next page.

Figure 6:
FIG. 6 is an example of a web site page for logging onto a third party archiving and verification provider's website in accordance with the several aspects of this invention.
Figure 7:
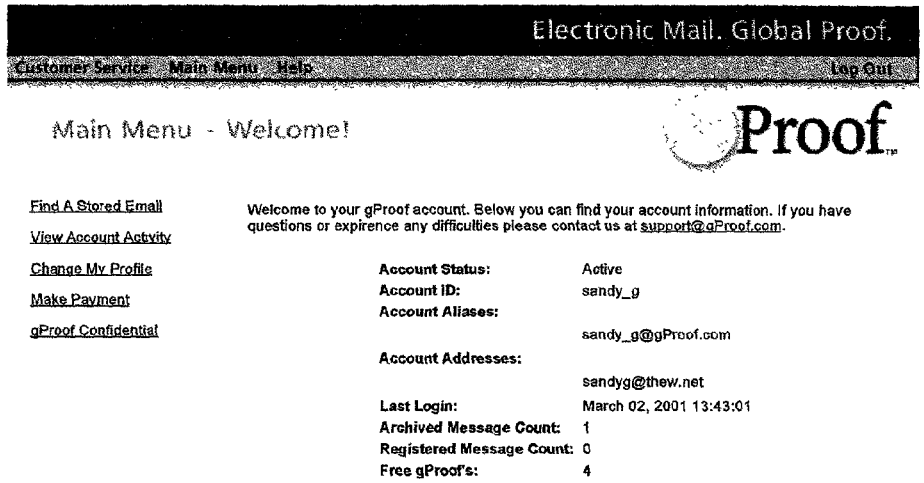
FIG. 7 is an example of a "Main Menu—Welcome" page of an administrative web site provided by a third party archiving and verification provider, as it would appear from a user's web browser.

An example of a web page for logging onto a third party verification provider's website is shown in FIG. 6. As shown in FIG. 6, the sender enters his or her ID, his or her Email Address, and his or her Account Password, and clicks on the "Secure Login" button. An example of an "Main Menu—Welcome" page of an administrative web site provided by a third party archiving and verification provider is shown in FIG. 7. As shown in FIG. 7, the "Main Menu—Welcome" page includes a fields displaying "Account Status", "Account ID", "Account Aliases", "Account Addresses", "Last Login", "Archived Message Count", "Registered Message Count", and "Free Messages". The "Main Menu—Welcome" page also includes a "Find A Stored Email" link; a "View Account Activity Link", a "Change My Profile" link, a "Make Payment" link, and a "gProof Confidential" link.

Figure 8:
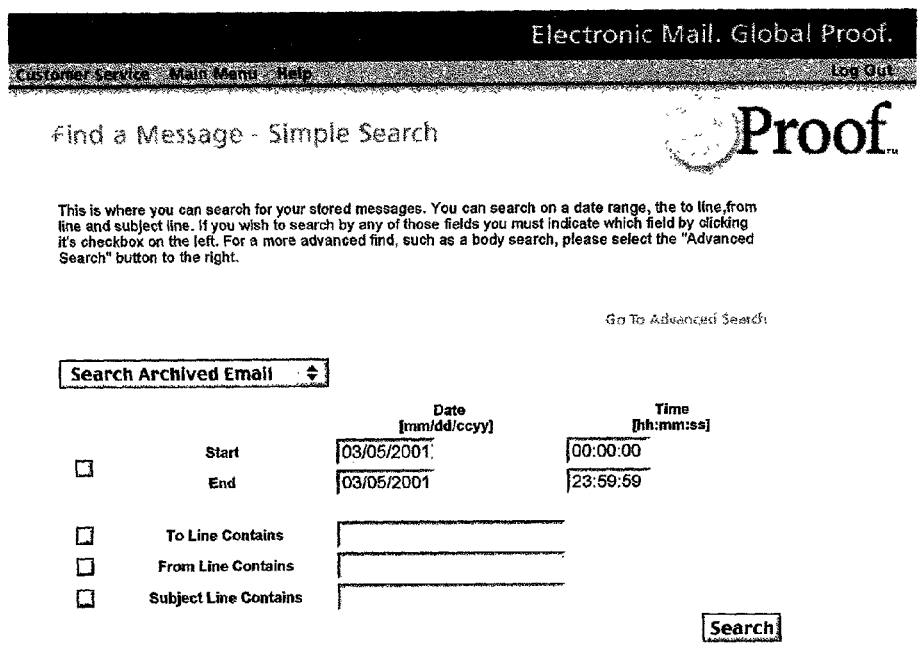
FIG. 8 is an example of a "Find a Message—Simple Search" page that would be reached through the "Find A Stored Email" link on the screen shown in FIG. 7.

An example of a "Find a Message—Simple Search" page that would be reached through the "Find A Stored Email" link on the page shown in FIG. 7, is shown in FIG. 8. As shown in FIG. 8, the "Find a Message—Simple Search" screen includes check boxes for enabling various search criteria. One criteria is the date of the email message, and if enabled, boxes are provided to enter search strings for the start date (default current date), a box to enter the start time (default 00:00:00), an end date (default current date), and an end time (default 23:59:59). Another search criteria is the contents of the "To:" line of the email message, and if enabled, a box labeled "To Line Contains" is provided to enter search strings. Another search criteria is the contents of the "From:" line of the email, and if enabled, a box labeled "From Line Contains" is provided to enter search strings. Still another search criteria is the contents of the "Subject:" line of the email message, and if enabled a box labeled "Subject Line Contains" is provided to enter a search string. A search button is also provided, which the user can click to execute the selected search. An example of the search results page is shown in FIG. 9. The Search Results page provides links to "Read" and to "Delete" each message displayed on the page. If the user clicks on the "Read" link, the message is displayed, together with a warning that a printout could have been modified. An example of such a page is shown in FIG. 10.

Figures 11, 12:
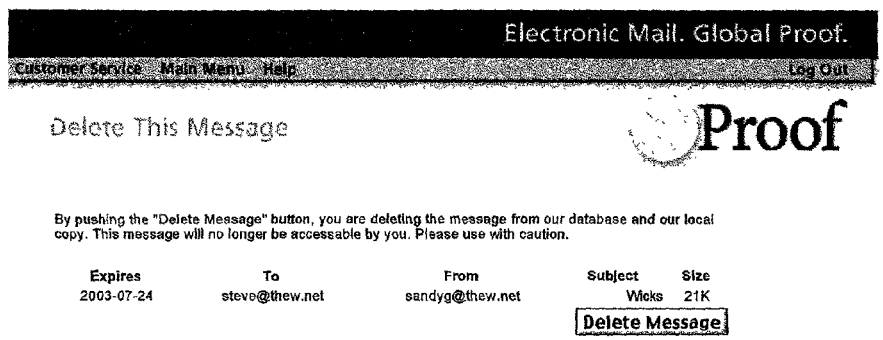
FIG. 11 is an example of a screen that might be displayed when the "Delete This Message" link on the Email Contents page of FIG. 10 is followed.
FIG. 12 is an example of a screen that might be displayed when the "Get a Notarized Copy" link on the FIG. 10 "mail Contents" page is followed.
Figure 13:
FIG. 13 is an example of a screen that might be displayed when the "Extend this Message" link on the FIG. 10 "Email Contents" page is followed.

As shown in FIG. 10, on the display page of an archived email, three links are provided: "Delete This Message", "Get a Notarized Copy", and "Extend This Message". The "Delete This Message" link causes the message to be deleted. FIG. 11 shows an example of a page that might appear when the "Delete This Message" link is clicked. The "Get a Notarized Copy" link initiates the preparation and of a paper copy of the email that is verified as correct. Can we provide a sample? FIG. 12 shows an example of a page that might appear when the "Get a Notarized Copy" link is clicked. As shown in FIG. 12, the page includes boxes for inputting the name, addess, city, state or region, zip or postal code, and a selection box to select the country. There is an "Order" button, which the user clicks to place the order, and have a verified copy of the selected email delivered to the specified address. The "Extend This Message" link extends the time that the message will remain archived. FIG. 13 shows an example of a page that might appear when the "Extend This Message" link is clicked. The page might contain the option to extend the archiving for one to seven years, providing pick buttons for making the selection, and a place order button for effecting the transaction. Before the expiration of the archive time, the sender will preferably be notified of the expiry of the archive time, and be given the option to extend the archive time.

Figure 14:
FIG. 14 shows an "Account Activity" page that might be displayed when the "View Account Activity" link on the FIG. 7 "Main Menu—Welcome" screen is followed.

FIG. 14 shows an "Account Activity" page that might be displayed if a user clicks the View Account Activity on the FIG. 7 "Main Menu—Welcome" page. As shown in FIG. 14, the "Account Activity" page can display "Invoice Number", "Date", "Amount", "Status" and "Paid Date" of the various charges incurred on the account.

Figure 15:
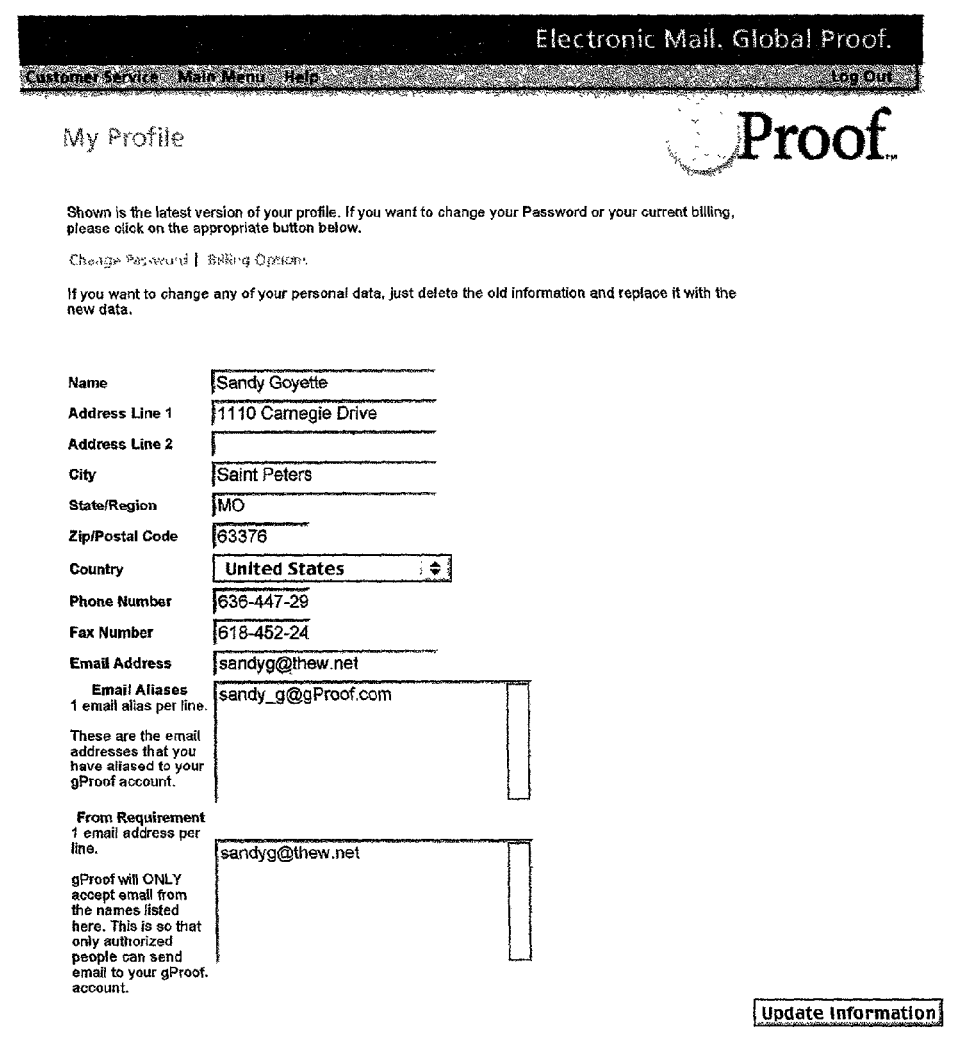

FIG. 15 shows a "My Profile" page that might be displayed if a user clicks the "Change My Profile" link on the FIG. 7 "Main Menu—Welcome" page. As shown in FIG. 15, the "My Profile" page can display fields for Name, Address, City, State or Region, Zip or Postal Code, a selection box for country, a telephone number, a facsimile number, an email address, email aliases, and From Requirements (email addresses authorized to send email to the third party verification provider). The user can replace or update information, and there is an "Update Information" button the user can click to update profile information.

Figures 16, 17:
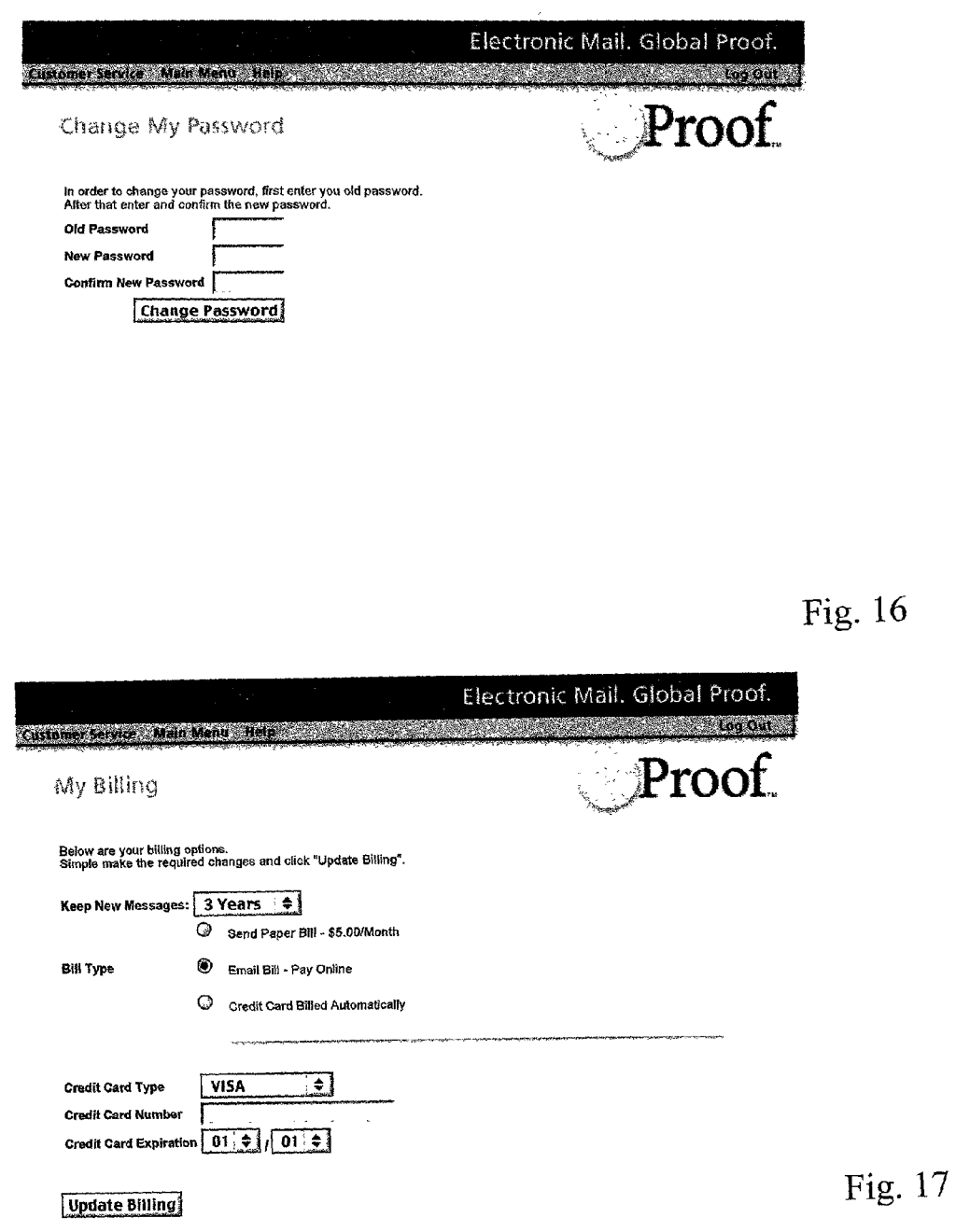

FIG. 16 shows a "Change My Password" page that might be displayed if a user clicks the "Change My Password" link on the FIG. 15 "My Profile" page. As shown in FIG. 16, the "Change My Password" page has boxes for entering the old password, the new password, and confirming the new password, and a "Change Password" button for the user to click to effect the change.

FIG. 17 shows a "My Billing" page that might be displayed if a user clicks the "Billing Options" link on the FIG. 15 "My Profile" page. As shown in FIG. 17, the "My Billing" page has a selection box labeled "Keep New Messages" for setting the default archive period, pick-buttons for "Send Paper Bill", "Email Bill—Pay Online", and "Credit Card Billed Automatically". The "My Billing" page also includes a selection box for selecting the credit card type, a box for entering the credit card number, and selection boxes for selecting the expiration date. An "Update Billing" button allows the user to update billing information.

Figure 18:
FIG. 18 shows a "Payment Status" page that might be displayed when the "Make Payment" link on the FIG. 7 "Main Menu—Welcome" screen is followed.
Figure 19:
FIG. 19 shows the second "Payment Status" page that might be displayed when the "Next" link on the FIG. 18 "Payment Status" page is followed.

FIG. 18 shows a "Payment Status" page that might be displayed if a user clicks the "Make Payment" link on the FIG. 7 "Main Menu—Welcome" page. As shown in FIG. 18, the "Payment Status" page displays a pick box for each outstanding invoice, and displays invoice number, date, status and amount. There is a "Next" button that the user clicks to continue with the payment process. FIG. 19 shows the second "Payment Status" page that is displayed when the user clicks "Next" on the FIG. 18 "Payment Status" page. As shown in FIG. 19, the second "Payment Status" page includes a selection box for selecting the credit card type, a box for entering the credit card number, and selection boxes for selecting the expiration date. A "Pay Bill" button allows the user to complete the payment.

Figure 20:
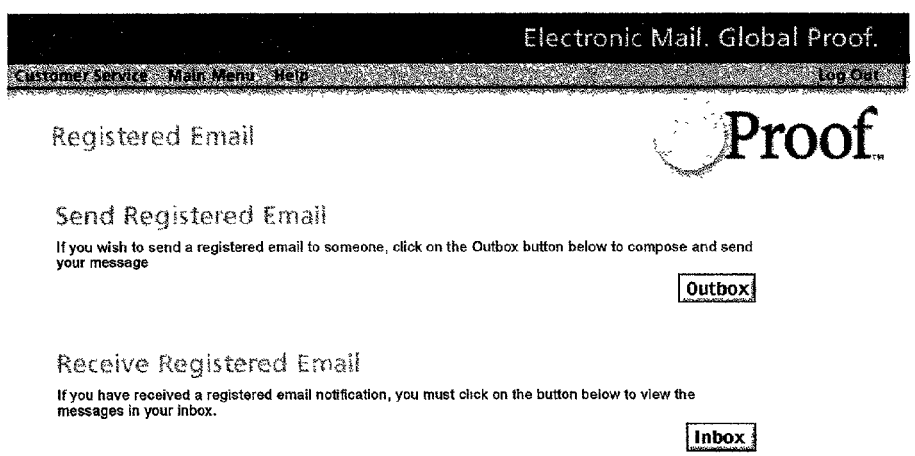
FIG. 20 is a "Registered Email" page this might be displayed when the "gProof Confidential" link on the FIG. 7 "Main Menu—Welcome" is followed.
Figure 21:
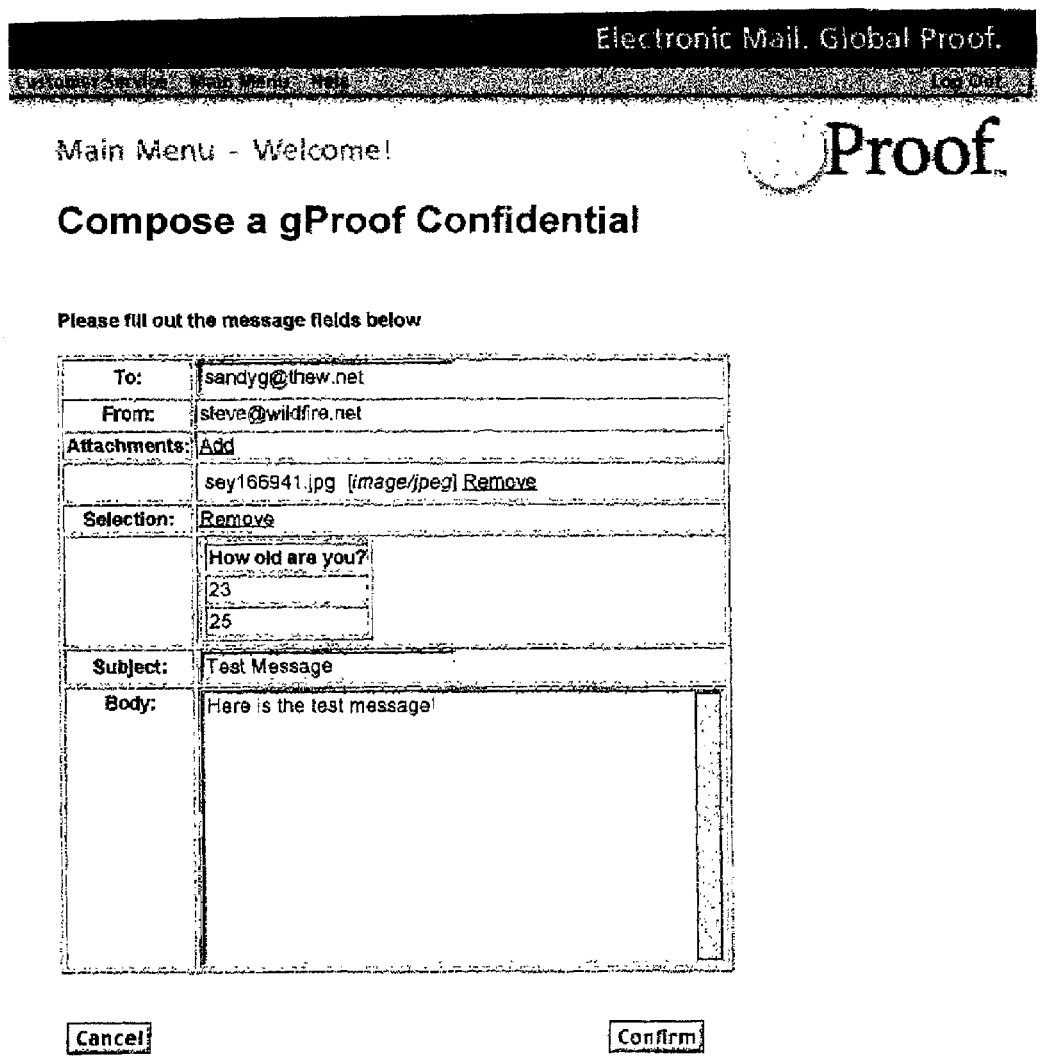
FIG. 21 is a "Send Registered Email" page that might displayed when the "Outbox" button on the FIG. 20 "Registered Email" page is clicked.
Figure 22:
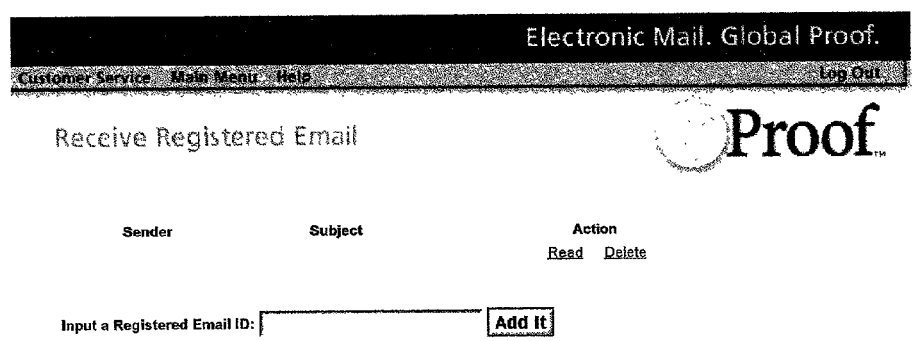
FIG. 22 is a "Receive Registered Email" page that might be displayed when the "Inbox" button on the FIG. 20 "Registered Email" page is clicked.

FIG. 20 is a "Registered Email" page this might be displayed when a user clicks on the "gProof Confidential" link on the FIG. 7 "Main Menu—Welcome" page. As shown in FIG. 20, the "Registered Email" page includes a "Send Registered Email" section with an "Outbox" button the user clicks to send a registered email, and a "Receive Registered Email" section, with an "Inbox" button the user clicks to receive a registered email. FIG. 21 is a "Send Registered Email" page that might displayed if a user clicks on the "Outbox" button on the FIG. 20 "Registered Email" page. As shown in FIG. 21, the "Send Reigstered Email" page has a "To:" box to enter the email address of the recipient, a "From:" box to enter the email address of the sender, an "Attachments:" box with an "Add" to add attachments; a "Selection:" box to either input selections for responses by the recipient (as described below), or to remove the selection feature; a "Subject:" box to enter a subject, and a "Body:" box to enter the text of the message. The page also includes a "Cancel" button and an "Submit" button to sent the email. FIG. 22 is a "Receive Registered Email" page that might be displayed if a user clicks on the "Inbox" button on the FIG. 20 "Registered Email" page. As shown in FIG. 22, the "Receive Registered Email" page has an "Input a Registered Email ID" box to ender the ID number of an email, and an "Add it" button to add it to the listing of registered emails displayed on the page. The page allows the recipient to see the sender and the subject, and provides links for each email to delete or to "Read" or to "Delete" the email.

According to a second aspect of this invention, a system and method is provided for allowing closed and secure communications on the internet. A problem with conventional email messages is that they may be stored on unsecure servers. According to this second aspect of this invention, messages are never sent over normal SMTP channels, and are instead created and read using SSL technology, and the documents remain on the system's servers.

The system and method of the present invention provide a secure method for Internet users to communicate registered emails on the Internet without using conventional email clients such as Microsoft's Outlook Express or Netscape's Network Navigator. Instead, messages are created and read inside a web browser such as Microsoft's Internet Explorer, or Netscape's Navigator. Further, unlike conventional email, the system and method of this invention allow the sender to know if and when a message has been read. The system and method allow the sender to see the state of any message, i.e., the user can see that the message has been delivered and read by the recipient, in contrast to conventional email where a user sends a message and is only notified when and if the recipient replies. According to an alternate aspect of the invention, the system and method also allows the sender to receive an electronic or telephone reply to a needed request.

On the FIG. 7 "Main Menu—Welcome" page, the user would click "gProof Confidential" link, and reach the FIG. 20 page. From the FIG. 20 page, the user the "Outbox" button to reach the FIG. 21 screen. On the FIG. 21 screen, the user is presented with an attachment box, an upload, and next buttons. As the user uploads files, they appear in the attachment box. Thee messages are stored on the system server as MIME entities. This preserves the content-type and other properties needed. The file names are defined as "internalMessageID.count++". After the user clicks the next button, the user is prompted with the "to", "from", "subject", and "body" form. The user is prompted with a confirmation of how much the message will cost and a "Send it" button.

Figure 23:
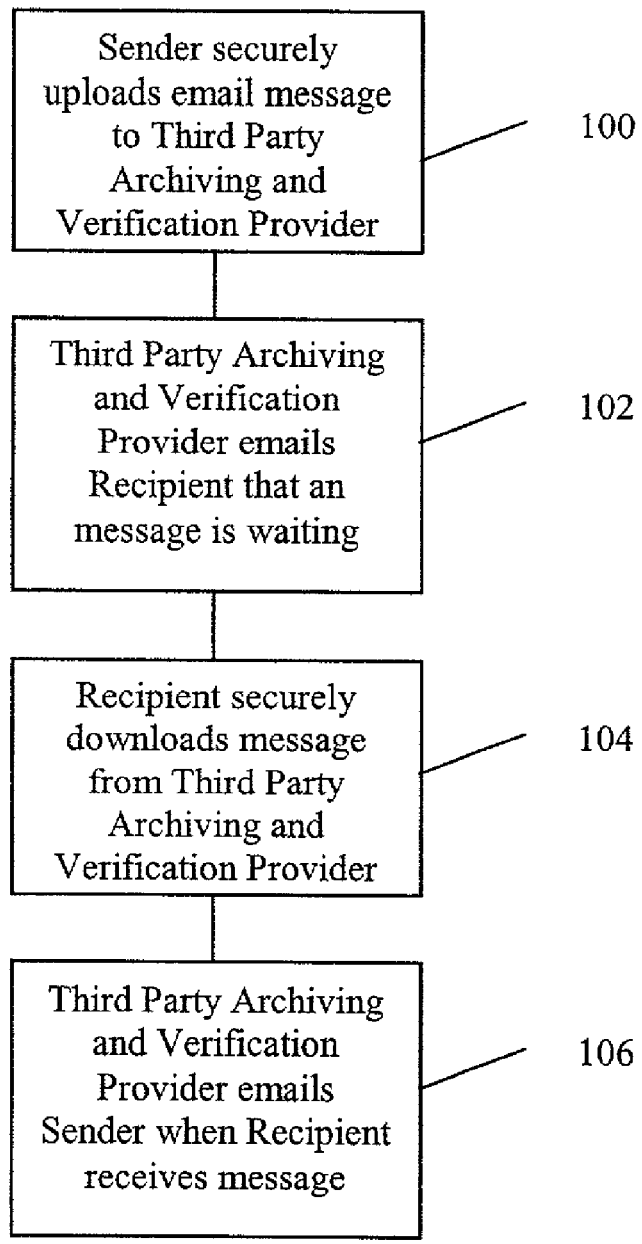
FIG. 23 is a schematic diagram of a secure method of email communication in accordance with a second aspect of this invention.

As shown in FIG. 23, at 100, the Sender securely uploads email message to Third Party Archiving and Verification Provider. At 102, Third Party Archiving and Verification Provider emails Recipient that an message is waiting. At 104, Recipient securely downloads message from Third Party Archiving and Verification Provider. At 106, Third Party Archiving and Verification Provider emails Sender when Recipient receives message.

When the sender clicks the confirm button on the FIG. 21 page, the system checks to see if the "To:" line is a registered user with the Third Party Archiving and Verification Service. If the addressee in the "To:" line is a registered user, the system automatically assigns that registered user's id to the message, and sends that user a message to logon and view the message. The recipient then logs onto the Third Party Archiving and Verification Provider's website, Entering a valid user id and password on the FIG. 6 page to reach the FIG. 7 "Main Menu—Welcome" page. By clicking the "gProof Confidential" link (gProof is a proprietary service mark), the recipient reaches the FIG. 20 page. By clicking "Inbox" under "Receive Registered Email", the recipient reaches the FIG. 22 page, where the recipient inputs the registered email id in the box, and clicks the "Add it" button. This delivers the email to the users inbox, where the user can access the message, as well as previous received messages and other store messages.

Where the recipient does not have an account with the Third Party Archiving and Verification Provider, the system and method can include a verification system to make sure that the message is delivered to the proper recipient. As described above, when the sender clicks the "Confirm" button on the FIG. 21 page, the system checks to see if the addressee in the "To:" has an account with the Third Party Archiving and Verification Provider. If the recipient does not have an account, the system sends an email that instructs the user to go to Third Party Archiving and Verification Provider's website and create an account. After the recipient creates an account, with the Third Party Archiving and Verification Provider's website, the system generates a 64 character string that relates to that user's email address. The system then sends an email to that address with the 64 character ID embedded in a link. When recipient clicks on that link, the system verifies that the recipient's email address is valid because they referenced an ID that was sent to that email address. The same ID is mapped to the same address in the Third Party Archiving and Verification Provider's database. After the user clicks the link, the Third Party Archiving and Verification Provider's system marks the recipient's account as active, then searches the database for any email messages that do not yet have an ID assigned to it, and which also have the recipient's email address in the "To:" line. After the system finds the email messages meeting these criteria, the messages are then assigned to that userID. Thus when the recipient logs in for the first time, the message or messages addressed to the recipient will be waiting for the recipient.

According to a third aspect of this invention, a system and method is provided to allow a user to preset choices for a recipient, and allow the recipient to make a selection by web browser or by telephone.

EXAMPLE

A project manager tells a client that changes need to be made to a customer's project and that the cost of those changes will be $1000. The project manager can send a confidential message describing the change, and creating selections, such as "A—Yes, make the changes", "B—No, do not make the changes", "C—Yes, but only if they can be done by 3:00 tomorrow afternoon", and "D—Please call me". The client will receive a normal email message that a message is waiting for delivery at the system's website. The user is able to check the status of the message and view the selection. A time and date stamp can be applied to show when the message was received, and when the selection was made.

In an alternate embodiment, the recipient can make the selection via telephone. The message would include a telephone number, which is preferably a toll free number. Upon calling the telephone number the recipient inputs an id number uniquely identifying the message the recipient is replying to, and is given instructions how to make the selection using the telephone keypad. The recipient's telephone number and selection are stored, and made available to the original user, for example via a website.

According to a fourth aspect of this invention, a system and method is provided that allows users to create a third party archive of their fax documents. Users can deliver faxes using their current workflow process simply by dialing into the system fax server and then entering the outgoing fax phone number. The system and method then allow the user to view faxed documents via an internet browser.

Figure 24:
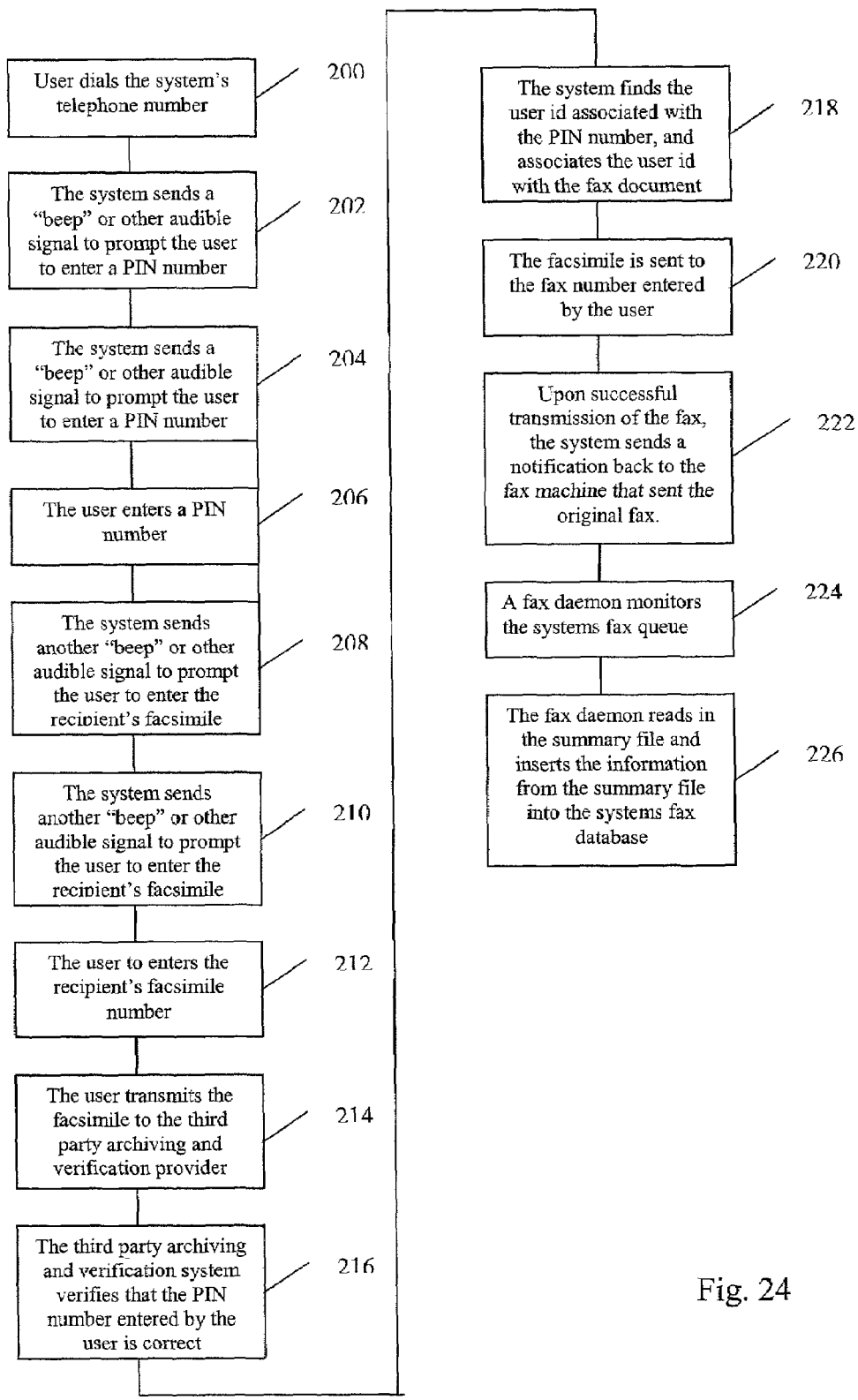
FIG. 24 is a schematic diagram of a method of verifying facsimile transmissions in accordance with a third aspect of this invention.

As shown in FIG. 24, when a user wants to send a fax, at 200, the user dials the system's telephone number, which preferably is a toll free number. At 202, the system sends a "beep" or other audible signal to prompt the user to enter a PIN number. At 204, the user enters a PIN number. At 206, the system sends another "beep" or other audible signal to prompt the user to enter the recipient's facsimile number. At 208, the user enters the recipient's facsimile number. At 210, the user transmits the facsimile to the third party archiving and verification provider.

At 212, the third party archiving and verification system verifies that the PIN number entered by the user is correct, by looking it up in a PIN table. At 214, if the PIN number is correct, the system finds the user id associated with the PIN number, and associates the user id with the fax document. At 216 the fax data is written to the system in two formats, a summary file and a data file. The summary file lists information relative to the fax received, such as the system user id, the number of pages, the time of transfer, and the user's PIN number. A data file is preferably a .pdf file, but the could be one or more pages of fax data stored as an image. At 218, the facsimile is sent to the fax number entered by the user. At 220, upon successful transmission of the fax, the system optionally sends a notification back to the fax machine that sent the original fax. Alternatively, or in addition, the system could send a notification only upon failure of transmission. Further, instead of sending a notification through the user's fax machine, or in addition to sending a notification through the user's fax machine, the system can send a email notification either of successful transmission and/or failure of transmission.

At 220, a fax daemon monitors the systems fax queue. At 222, when the fax daemon finds a summary file, the fax daemon reads in the summary file and inserts the information from the summary file into the systems fax database. The data files are then moved to the user's fax directory.

Figure 25:
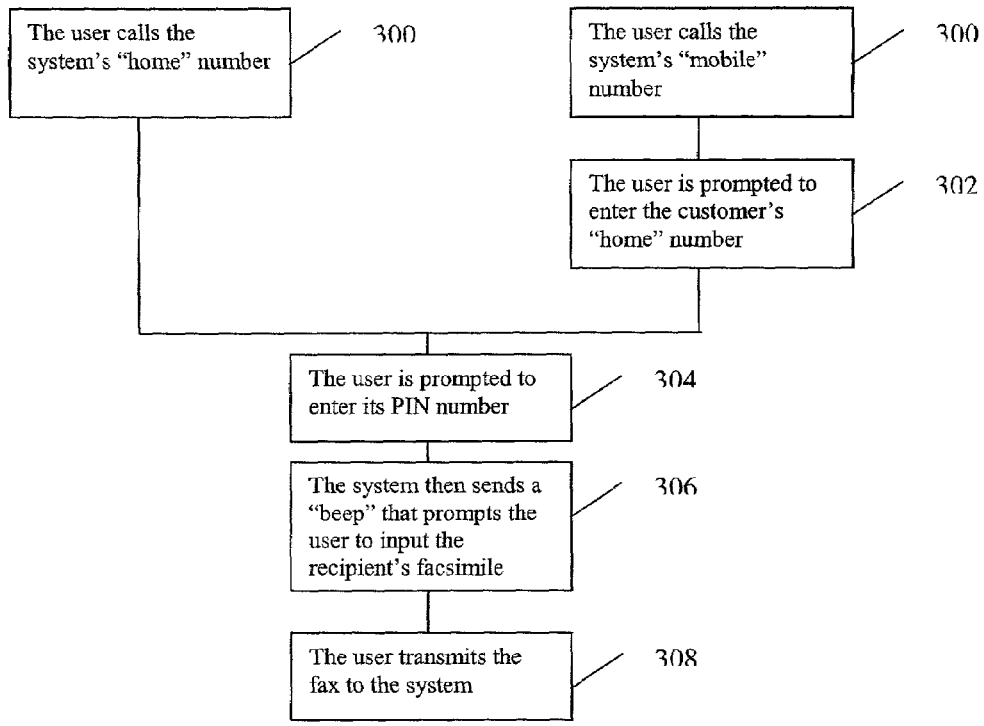
FIG. 25 is a schematic diagram of a method of verifying facsimile transmissions in accordance with this invention.

An alternative implementation is shown in FIG. 25. The system shown in FIG. 25 includes at least two telephone numbers, the first number is the system "home" number for receiving calls from the users home or main fax number; and the second number is the system's "mobile" number, which gives the user the ability to fax from machines other than the user's home or main fax number. When a call is received on the system "home" number, the user is prompted for a PIN number, and if the PIN number input by the user, and the user's calling number detected via caller id or similar methods are authenticated, the system accepts the recipient's fax number, and the system is set up to accept the facsimile. When a call is received on the system's "mobile" number, the user is prompted to input a PIN number and the user's home calling number, and if the PIN number and home calling number input by the user are authenticated, the system accepts the recipient's fax number, and the system is set up to accept the facsimile.

As shown in FIG. 25, at 300 the user calls either the system "home" number or the systems "mobile" number. At 302, if the call is made to the system's "mobile" number, the user is prompted to enter the customer's "home" number. At 304, the user is prompted to enter its PIN number. The PIN number is preferably a unique four digit number. At 328, the home number (detected if the call is on the "home" number, or input if the call is on the "mobile" number), and the PIN number are authenticated. At 306, the system then sends a "beep" or other audible tone that prompts the user to in put the recipient's facsimile number. At 308, the user transmits the fax to the system.

APPENDIX A

```

# holds the email address that are valid for a given user_id

CREATE TABLE address (
        address_id bigint(20) DEFAULT '0' NOT NULL auto_increment,
        user_id bigint(21) DEFAULT '0' NOT NULL,
        email_address varchar(100) DEFAULT '' NOT NULL,
        KEY address_idx (user_id),
        PRIMARY KEY (address_id)
);

# which email addresses are aliases to gproof accounts

CREATE TABLE alias (
        user_id bigint(21) DEFAULT '0' NOT NULL,
        email_address varchar(100) DEFAULT '' NOT NULL,
        alias_on tinyint(4) DEFAULT '0' NOT NULL,
        PRIMARY KEY (email_address),
        KEY alias_idx (user_id)
);

# gproof selection table - choices

CREATE TABLE choice (
        choice_id bigint(20) DEFAULT '0' NOT NULL auto_increment,
        choice_user_id bigint(20) DEFAULT '0' NOT NULL,
        choice_answer_number tinyint(4) DEFAULT '0' NOT NULL,
        choice_question varchar(220) DEFAULT '' NOT NULL,
        choice_1 varchar(220),
        choice_2 varchar(220),
        choice_3 varchar(220),
        choice_4 varchar(220),
        choice_5 varchar(220),
        choice_6 varchar(220),
        choice_7 varchar(220),
        choice_8 varchar(220),
        PRIMARY KEY (choice_id)
);

# stores users credit card information

CREATE TABLE credit_card (
        user_id bigint(21) DEFAULT '0' NOT NULL,
        card_number varchar(40) DEFAULT '' NOT NULL,
        card_expire varchar(7) DEFAULT '' NOT NULL,
        card_type tinyint(4) DEFAULT '0' NOT NULL,
        PRIMARY KEY (user_id)
);
```

APPENDIX A-continued

```

# batch payment table for cybercash

CREATE TABLE cybercash (
    user_id bigint(21) DEFAULT '0' NOT NULL,
    invoice_number varchar(24),
    invoice_amount float(10,2) DEFAULT '0.00' NOT NULL,
    credit_card_number varchar(40) DEFAULT '' NOT NULL,
    credit_card_expire varchar(6) DEFAULT '' NOT NULL,
    cybercash_status tinyint(4) DEFAULT '0' NOT NULL,
    KEY cybercash_idx (cybercash_status)
);

# email addresses that are verified by gproof

CREATE TABLE email (
    user_id bigint(20) DEFAULT '0' NOT NULL,
    email_address varchar(100) DEFAULT '' NOT NULL,
    PRIMARY KEY (email_address)
);

# temporary holding place while an email address is being verified

CREATE TABLE email_verify (
    user_id bigint(20) DEFAULT '0' NOT NULL,
    email_address varchar(100) DEFAULT '' NOT NULL,
    email_code varchar(100) DEFAULT '' NOT NULL
);

# fax table - holds information about each fax

CREATE TABLE fax (
    fax_id varchar(24) DEFAULT '' NOT NULL,
    user_id bigint(20) DEFAULT '0' NOT NULL,
    fax_folder_id tinyint(4) DEFAULT '0' NOT NULL,
    fax_description varchar(120),
    fax_from_number varchar(20) DEFAULT '' NOT NULL,
    fax_to_number varchar(20) DEFAULT '' NOT NULL,
    fax_date date DEFAULT '0000-00-00' NOT NULL,
    fax_time time DEFAULT '00:00:00' NOT NULL,
    fax_transmit_time int(11),
    PRIMARY KEY (fax_id)
);

# contains the fax pin numbers for each user

CREATE TABLE fax_pin (
    pin_id bigint(20) DEFAULT '0' NOT NULL auto_increment,
    user_id bigint(20) DEFAULT '0' NOT NULL,
    pin_number varchar(20) DEFAULT '00000000000000000000' NOT NULL,
    PRIMARY KEY (pin_id),
    UNIQUE fax_pin_idx (pin_number)
);

# folders to organize your content..faxes,email,documents...

CREATE TABLE folder (
    user_id bigint(20) DEFAULT '0' NOT NULL,
    folder_id tinyint(4) DEFAULT '0' NOT NULL,
    folder_name varchar(60) DEFAULT '' NOT NULL
);

# tell a friend table - get free gproofs for recommending gproof
# to a friend.

CREATE TABLE friend_data (
    email_address varchar(80) DEFAULT '' NOT NULL,
    PRIMARY KEY (email_address)
);

# how many friends each user has told

CREATE TABLE friend_info (
    user_id bigint(21) DEFAULT '0' NOT NULL,
    friend_points int(11) DEFAULT '0' NOT NULL,
    friend_attempts tinyint(4) DEFAULT '0' NOT NULL
);

# invoice table - billing system generates entries
```

APPENDIX A-continued

```
# for this table.

CREATE TABLE invoice (
    user_id bigint(20) DEFAULT '0' NOT NULL,
    invoice_id bigint(20) DEFAULT '0' NOT NULL,
    invoice_number varchar(24) DEFAULT '' NOT NULL,
    invoice_start date DEFAULT '0000-00-00' NOT NULL,
    invoice_end date DEFAULT '0000-00-00' NOT NULL,
    invoice_amount float(10,2) DEFAULT '0.00' NOT NULL,
    invoice_status tinyint(4) DEFAULT '0' NOT NULL,
    invoice_paid_date date DEFAULT '0000-00-00' NOT NULL,
    invoice_paid_type tinyint(4) DEFAULT '0' NOT NULL,
    invoice_paid_amount float(10,2) DEFAULT '0.00' NOT NULL,
    PRIMARY KEY (invoice_number),
    KEY num_idx (invoice_number),
    KEY status_idx (invoice_status)
);

# message table - holds gProof emails

CREATE TABLE message (
    message_id varchar(24) DEFAULT '' NOT NULL,
    user_id bigint(21) DEFAULT '0' NOT NULL,
    message_folder_id tinyint(4) DEFAULT '0' NOT NULL,
    message_to varchar(60) DEFAULT '' NOT NULL,
    message_from varchar(60) DEFAULT '' NOT NULL,
    message_subject varchar(60) DEFAULT '' NOT NULL,
    message_date date DEFAULT '0000-00-00' NOT NULL,
    message_time time DEFAULT '00:00:00' NOT NULL,
    message_size int(11) DEFAULT '0' NOT NULL,
    message_expire date DEFAULT '0000-00-00' NOT NULL,
    message_paid tinyint(4) DEFAULT '0' NOT NULL,
    KEY message_user_idx (user_id),
    KEY message_to_idx (message_to(5)),
    KEY message_from_idx (message_from(5)),
    KEY message_subject_idx (message_subject(10)),
    KEY message_paid_idx (message_paid),
    PRIMARY KEY (message_id)
);

# unique id generator for an invoice number

CREATE TABLE next_invoice (
    invoice_key int(10) unsigned DEFAULT '0' NOT NULL auto_increment,
    PRIMARY KEY (invoice_key)
);

# unique id generator for a message,fax or confidential

CREATE TABLE next_message (
    message_key int(10) unsigned DEFAULT '0' NOT NULL auto_increment,
    PRIMARY KEY (message_key)
);

# unique id generator for a user

CREATE TABLE next_user (
    user_key bigint(21) DEFAULT '0' NOT NULL auto_increment,
    PRIMARY KEY (user_key)
);

# queue for waiting notarization requests

CREATE TABLE notarize (
    user_id bigint(21) DEFAULT '0' NOT NULL,
    message_id varchar(24) DEFAULT '' NOT NULL,
    ship_to varchar(30) DEFAULT '' NOT NULL,
    ship_address1 varchar(30) DEFAULT '' NOT NULL,
    ship_address2 varchar(30),
    ship_city varchar(30),
    ship_state varchar(30),
    ship_zip varchar(20),
    ship_country char(2),
    notarize_status tinyint(4) DEFAULT '0',
    notarize_request_date date,
    notarize_fulfilled_date date,
    notarize_staff_id int(11) DEFAULT '0' NOT NULL,
    KEY message_idx (message_id)
);
```

APPENDIX A-continued

```

# gProof cataloging daemon message queue - the
# cataloger watches this queue for incoming
# messages waiting to be processed

CREATE TABLE queue (
    queue_id int(11) DEFAULT '0' NOT NULL,
    message_id bigint(20) DEFAULT '0' NOT NULL
);

# holds gProof confidential messages

CREATE TABLE register (
    register_id varchar(24) DEFAULT '' NOT NULL,
    register_reference varchar(40) DEFAULT '' NOT NULL,
    register_sender bigint(20) DEFAULT '0' NOT NULL,
    register_receiver bigint(20) DEFAULT '0' NOT NULL,
    register_to varchar(60) DEFAULT '' NOT NULL,
    register_from varchar(60) DEFAULT '' NOT NULL,
    register_subject varchar(60),
    register_sent_when_date date DEFAULT '0000-00-00' NOT NULL,
    register_sent_when_time time DEFAULT '00:00;00' NOT NULL,
    register_sent_where varchar(16) DEFAULT '000.000.000.000' NOT NULL,
    register_read_when_date date DEFAULT '0000-00-00' NOT NULL,
    register_read_when_time time DEFAULT '00:00:00' NOT NULL,
    register_read_where varchar(16) DEFAULT '000.000.000.000' NOT NULL,
    register_status tinyint(4) DEFAULT '0' NOT NULL,
    register_folder_id tinyint(4) DEFAULT '0' NOT NULL,
    register_choice_id bigint(20) DEFAULT '0' NOT NULL,
    register_expiration_date date DEFAULT '0000-00-00' NOT NULL,
    PRIMARY KEY (register_id),
    KEY sender_idx (register_sender)
);

# the web application monitors when users
# try to do illegal requests...and logs them
# here.

CREATE TABLE security_log (
    user_id bigint(21) DEFAULT '0' NOT NULL,
    user_ip varchar(16) DEFAULT '' NOT NULL,
    action_id tinyint(4) DEFAULT '0' NOT NULL,
    action_timestamp timestamp(14)
);

# basic logging of users actions

CREATE TABLE system_log (
    user_id bigint(20) DEFAULT '0' NOT NULL,
    log_module varchar(60) DEFAULT 'Unknown' NOT NULL,
    log_action varchar(40) DEFAULT 'Unknown' NOT NULL,
    log_timestamp timestamp(14),
    log_details varchar(120)
);

# transactions that we charge for are inserted in this
# table when needed.

CREATE TABLE transaction (
    transaction_id bigint(21) DEFAULT '0' NOT NULL auto_increment,
    user_id bigint(21) DEFAULT '0' NOT NULL,
    transaction_type enum('Free Email','Email Received','Email Notarized','Email
Extended','Confidential Sent','Fax Sent') DEFAULT 'Email Received' NOT NULL,
    transaction_reference varchar(24),
    transaction_date date DEFAULT '0000-00-00' NOT NULL,
    transaction_time time DEFAULT '00:00:00' NOT NULL,
    transaction_amount decimal(10,2) DEFAULT '0.00' NOT NULL,
    transaction_extra varchar(20),
    transaction_paid tinyint(4) DEFAULT '0' NOT NULL,
    invoice_id bigint(20) DEFAULT '0' NOT NULL,
    PRIMARY KEY (transaction_id),
    KEY transaction_user_idx (user_id)
);

# our user table

CREATE TABLE user (
    user_id bigint(21) DEFAULT '0' NOT NULL,
    user_group_id int(11) DEFAULT '0' NOT NULL,
```

APPENDIX A-continued

```
    user_login varchar(14) DEFAULT '' NOT NULL,
    user_name varchar(60) DEFAULT '' NOT NULL,
    user_address1 varchar(30) DEFAULT '' NOT NULL,
    user_address2 varchar(30),
    user_city varchar(40) DEFAULT '' NOT NULL,
    user_state varchar(20),
    user_zip varchar(20) DEFAULT '' NOT NULL,
    user_country int(11) DEFAULT '0' NOT NULL,
    user_phone varchar(16) DEFAULT '' NOT NULL,
    user_fax varchar(16),
    user_email varchar(100) DEFAULT '' NOT NULL,
    user_password varchar(20) DEFAULT '' NOT NULL,
    user_signup date DEFAULT '0000-00-00' NOT NULL,
    user_last timestamp(14),
    user_status tinyint(4) DEFAULT '0' NOT NULL,
    user_type tinyint(4) DEFAULT '0' NOT NULL,
    user_bill_date date DEFAULT '0000-00-00' NOT NULL,
    user_bill_type tinyint(4) DEFAULT '1' NOT NULL,
    user_free_email int(4) DEFAULT '0' NOT NULL,
    user_keep_email tinyint(4) DEFAULT '0' NOT NULL,
    user_keep_fax tinyint(4) DEFAULT '1' NOT NULL,
    sales_id int(11) DEFAULT '0' NOT NULL,
    sales_percent double(16,4) DEFAULT '0.0000' NOT NULL,
    reseller_id int(11) DEFAULT '0' NOT NULL,
    reseller_percent double(16,4) DEFAULT '0.0000' NOT NULL,
    PRIMARY KEY (user_id),
    UNIQUE user_login_idx (user_login),
    UNIQUE user_email_idx (user_email)
);
```

What is claimed is:

1. A method of secure electronic communication comprising:

transmitting to a third party via a secure Internet connection an email message to be sent, and an email address of at least one intended recipient of the email message, the third party storing an exact copy of the email message for a time specified by a sender, and sending an email notification to the intended recipient indicating that the email message is waiting for the intended recipient via a secure Internet website of the third party, wherein the intended recipient enters a valid username and password to log on to the third party's Internet website to establish the secure Internet connection with the third party, and clicks on an inbox to initiate delivery of the email message waiting for the intended recipient, and the third party transmits the email message to the intended recipient who establishes the secure Internet connection with the third party, and sends the email notification to the sender when the email message has been transmitted to the intended recipient, the third party alerting the sender when the copy of the email message that was stored for a time period specified by the sender is about to be deleted if the sender does not extend the time period, and the third party extending the time period for storing the copy of the email message for a fee when requested by the sender.

2. The method according to claim 1 wherein the secure Internet connection between the sender and the third party is an SSL connection.

3. The method according to claim 1 wherein the secure Internet connection between the at least one intended recipient and the third party is SSL connection.

4. The method according to claim 1 wherein the email message to the at least one intended recipient includes instructions on how to establish a secure Internet connection to receive the message.

5. The method according to claim 1 wherein the email message includes at least a URL to establish the secure Internet connection.

* * * * *